(12) United States Patent
Ficet et al.

(10) Patent No.: US 10,110,464 B2
(45) Date of Patent: Oct. 23, 2018

(54) METHOD OF MONITORING AND WARNING FOR CONFIGURING ROUTING IN A CLUSTER COMPRISING STATIC COMMUNICATION LINKS AND COMPUTER PROGRAM IMPLEMENTING THAT METHOD

(71) Applicant: BULL SAS, Les Clayes sous Bois (FR)

(72) Inventors: Jean-Vincent Ficet, La Chapelle Blanche (FR); Sébastien Dugue, Saint Theoffrey (FR); Jean-Olivier Gerphagnon, Vif (FR)

(73) Assignee: BULL SAS, Les Clayes sous Bois (FR)

( * ) Notice: Subject to any disclaimer, the term of this patent is extended or adjusted under 35 U.S.C. 154(b) by 0 days.

(21) Appl. No.: 15/508,363

(22) PCT Filed: Aug. 31, 2015

(86) PCT No.: PCT/FR2015/052298
§ 371 (c)(1),
(2) Date: Mar. 2, 2017

(87) PCT Pub. No.: WO2016/034797
PCT Pub. Date: Mar. 10, 2016

(65) Prior Publication Data
US 2017/0289016 A1 Oct. 5, 2017

(30) Foreign Application Priority Data
Sep. 3, 2014 (FR) .................... 14 58250

(51) Int. Cl.
*H04L 12/715* (2013.01)
*H04L 12/721* (2013.01)

(52) U.S. Cl.
CPC ............. *H04L 45/04* (2013.01); *H04L 45/70* (2013.01)

(58) Field of Classification Search
CPC ..... H04L 41/12; H04L 12/4604; H04L 45/00; H04L 45/02; H04L 45/04; H04L 45/24;
(Continued)

(56) References Cited

U.S. PATENT DOCUMENTS

| 7,426,210 B1 * | 9/2008 | Miles | H04J 14/0223 370/400 |
|---|---|---|---|
| 2009/0125685 A1 * | 5/2009 | Bayer | G06F 13/4243 711/149 |

(Continued)

FOREIGN PATENT DOCUMENTS

WO WO 2011/144848 A1 11/2011

OTHER PUBLICATIONS

International Preliminary Report on Patentability and the Written Opinion of the International Searching Authority as issued in International Patent Application No. PCT/FR2015/052298, dated Mar. 7, 2017.

(Continued)

*Primary Examiner* — Hassan Kizou
*Assistant Examiner* — Robert A Shand
(74) *Attorney, Agent, or Firm* — Pillsbury Winthrop Shaw Pittman LLP

(57) ABSTRACT

The method relates to the monitoring of at least one routing parameter for a cluster including nodes and switches, static communication links connecting nodes and switches. Each switch includes several output ports. After having selected at least one switch, a number of routes per port is calculated for each port of each switch selected, routes being defined during a routing step for each connecting one node to another. A mean number of routes per port is then calculated for the at least one selected switch. Each number of routes per port calculated is then compared with the mean number of routes per port calculated and, in response to this com- (Continued)

parison, a potential imbalance of routing of the cluster is notified.

9 Claims, 5 Drawing Sheets

(58) Field of Classification Search
CPC ......... H04L 45/70; H04L 49/10; H04L 49/12; H04L 49/30
See application file for complete search history.

(56) References Cited

U.S. PATENT DOCUMENTS

| | | | |
|---|---|---|---|
| 2010/0180048 A1* | 7/2010 | Guo ..................... | H04L 45/125 709/242 |
| 2011/0010468 A1* | 1/2011 | Hu ....................... | G06F 15/16 709/250 |
| 2014/0064287 A1* | 3/2014 | Bogdanski ............. | H04L 49/15 370/400 |
| 2016/0127236 A1* | 5/2016 | Zahid .................... | H04L 45/04 709/219 |

OTHER PUBLICATIONS

International Search Report as issued in International Patent Application No. PCT/FR2015/052298, dated Oct. 20, 2015.
Hoefler, T., et al., "Optimized Routing for Large-Scale InfiniBand Networks," 17th IEEE Symposium on High Performance Interconnects, Aug. 2009, XP031528530, pp. 103-111.

* cited by examiner

METHOD OF MONITORING AND WARNING FOR CONFIGURING ROUTING IN A CLUSTER COMPRISING STATIC COMMUNICATION LINKS AND COMPUTER PROGRAM IMPLEMENTING THAT METHOD

CROSS-REFERENCE TO RELATED APPLICATIONS

This is the U.S. National Stage of PCT/FR2015/052298, filed Aug. 31, 2015, which in turn claims priority to French Patent Application No. 1458250, filed Sep. 3, 2014, the entire contents of all applications are incorporated herein by reference in their entireties.

The present invention concerns the routing in a cluster, that is to say the determination of communication routes between a set of nodes of the cluster, and more particularly a method of monitoring and warning for configuring routing in a cluster comprising static communication links as well as a computer program implementing that method.

HPC (standing for High Performance Computing) is being developed for university research and industry alike, in particular in technical fields such as aeronautics, energy, climatology and life sciences. Modeling and simulation make it possible in particular to reduce development costs and to accelerate the placing on the market of innovative products that are more reliable and consume less energy. For research workers, high performance computing has become an indispensable means of investigation.

This computing is generally conducted on data processing systems called clusters. A cluster typically comprises a set of interconnected nodes. Certain nodes are used to perform computing tasks (compute nodes), others to store data (storage nodes) and one or more others manage the cluster (administration nodes). Each node is for example a server implementing an operating system such as Linux (Linux is a trademark). The connection between the nodes is, for example, made using Ethernet or InfiniBand communication links (Ethernet and InfiniBand are trademarks).

FIG. 1 is a diagrammatic illustration of an example of a topology 100 for a cluster, of fat-tree type. The latter comprises a set of nodes of general reference 105. The nodes belonging to the set 110 are compute nodes here whereas the nodes of the set 115 are service nodes (storage nodes and administration nodes). The compute nodes may be grouped together in sub-sets 120 called compute islets, the set 115 being called a service islet.

The nodes are linked together by switches, for example hierarchically. In the example illustrated in FIG. 1, the nodes are connected to first-level switches 125 which are themselves linked to second-level switches 130 which in turn are linked to third-level switches 135.

As illustrated in FIG. 2, each node generally comprises one or more microprocessors, local memories and a communication interface. More specifically, the device 200 here comprises a communication bus 202 to which there are connected:

Central Processing Units (CPUs) or microprocessors 204;
components of Random Access Memory (RAM) 206, comprising registers adapted to record variables and parameters created and modified during the execution of programs (as illustrated, each random access memory component may be associated with a microprocessor); and,
communication interfaces 208 adapted to send and to receive data.

The node 200 furthermore possesses here internal storage means 212, such as hard disks, able in particular to contain the executable code of programs.

The communication bus allows communication and interoperability between the different elements included in the device 200 or connected to it. The microprocessors 204 control and direct the execution of the instructions of portions of software code of the program or programs. On powering up, the program or programs which are stored in a non-volatile memory, for example a hard disk, are transferred into the random access memory 206.

It is observed here that the performance of a cluster is directly linked to the choice of the routes enabling the transfer of data between the nodes, that are established via communication links. In general terms, physical communication links are established between the nodes and the switches at the time of the hardware configuration of a cluster, the communication routes themselves being determined in an initialization phase on the basis of a definition of the connections to be established between the nodes. According to the communication technology implemented, the configuration of the routes may be static or dynamic.

By way of illustration, the InfiniBand technology enables, in a cluster, a static configuration of the routes. This configuration uses static routing tables, known as Linear Forwarding Tables (LFTs), in each switch. When this technology is implemented, a routing algorithm such as the algorithms known under the names FTree, MINHOP, UPDN and LASH may be used.

The choice of the algorithm to be used is typically made by an administrator based, in particular, according to the topology of the cluster. It may, for example, be the FTree algorithm. However, if the algorithm chosen does not enable the routing to be made the manager of the cluster (typically in charge of the routing) in general automatically chooses another algorithm, for example the MINHOP algorithm (which is generally of less good performance than that initially chosen).

By way of illustration and in simplified manner, the FTree algorithm determines routes such that they are distributed as much as possible through existing communication links. For these purposes, at the time of the routing of a communication network fully connected in accordance with a fat-tree type architecture, each node of the network is considered as having the same importance. Thus, when a route is established between two nodes of the same link, the number of routes using that link, called the load of the link, is increased by one. When the routing algorithm seeks to establish a new route and there are several possibilities, it compares the load levels associated with the links on which those possibilities are based and chooses the one whose links have the lowest load level.

During use of the cluster, if a link or a component such as a node or a switch suffers a fault, new routing is carried out.

As the quality of routing has a direct influence on the performance of a cluster, there is a need to monitor a routing configuration in a cluster comprising static communication links and, if required, warn an administrator of a potential routing problem.

The invention enables at least one of the problems set forth above to be solved.

The invention is thus directed to a computer method for monitoring at least one routing parameter of a cluster comprising a plurality of nodes and a plurality of switches, static communication links linking nodes and switches of said pluralities of nodes and switches, each switch comprising a plurality of output ports, this method being characterized in that it comprises the following steps, selecting at least one switch from said plurality of switches;

computing a number of routes per port for each port of each selected switch, routes being defined at a routing step for each to link one node to another;

computing an average number of routes per port for the at least one selected switch;

performing comparison of each computed number of routes per port with the computed average number of routes per port; and in response to said comparison, providing notification of a potential routing imbalance of said cluster.

The method according to the invention thus makes it possible to detect and provide notification of a potential routing problem able to cause a performance drop of the cluster.

According to a particular embodiment, each switch comprises a routing table to identify a port according to a feature of a received data packet, the method further comprising a step of obtaining a routing table for each selected switch, said step of computing a number of routes per port for each port of each selected switch being based on a routing table obtained for each selected switch.

According to a particular embodiment, said step of comparing each number of routes per port with the average number of routes per port comprises a step of computing the difference of each number of routes per port compared with the average number of routes per port and a step of comparing the difference with at least one threshold.

According to a particular embodiment, said step of computing the difference of each number of routes per port compared with the average number of routes per port is a step of computing the absolute value of the difference between each number of routes per port and the average number of routes per port.

According to a particular embodiment, the difference of each number of routes per port compared with the average number of routes per port is considered as being null if it is negative.

According to a particular embodiment, said comparison of the difference with at least one threshold comprises a step of selecting a first or a second threshold depending on whether the difference is positive or negative.

According to a particular embodiment, the method further comprises the following steps:

identifying an algorithm selected to route said cluster;

identifying an algorithm used to route said cluster; and if the identifiers of said algorithm selected and said algorithm used to route said cluster are different, providing notification of a potential problem of routing optimization of said cluster.

According to a particular embodiment, the method loops back on itself to identify a potential routing problem of said cluster.

According to a particular embodiment, the method is implemented in a cluster manager of InfiniBand type.

The invention also relates to a computer program comprising instructions adapted for the implementation of each of the steps of the method described earlier when said program is executed on a computer and to an information storage means, removable or not, that is partially or totally readable by a computer or a microprocessor containing code instructions of a computer program for executing each of the steps of the method earlier.

The advantages procured by this computer program and this information storage means are similar to those referred to above.

Other advantages, objects and features of the present invention will emerge from the following detailed description, given by way of non-limiting example, relative to the accompanying drawings in which.

Figure 3:
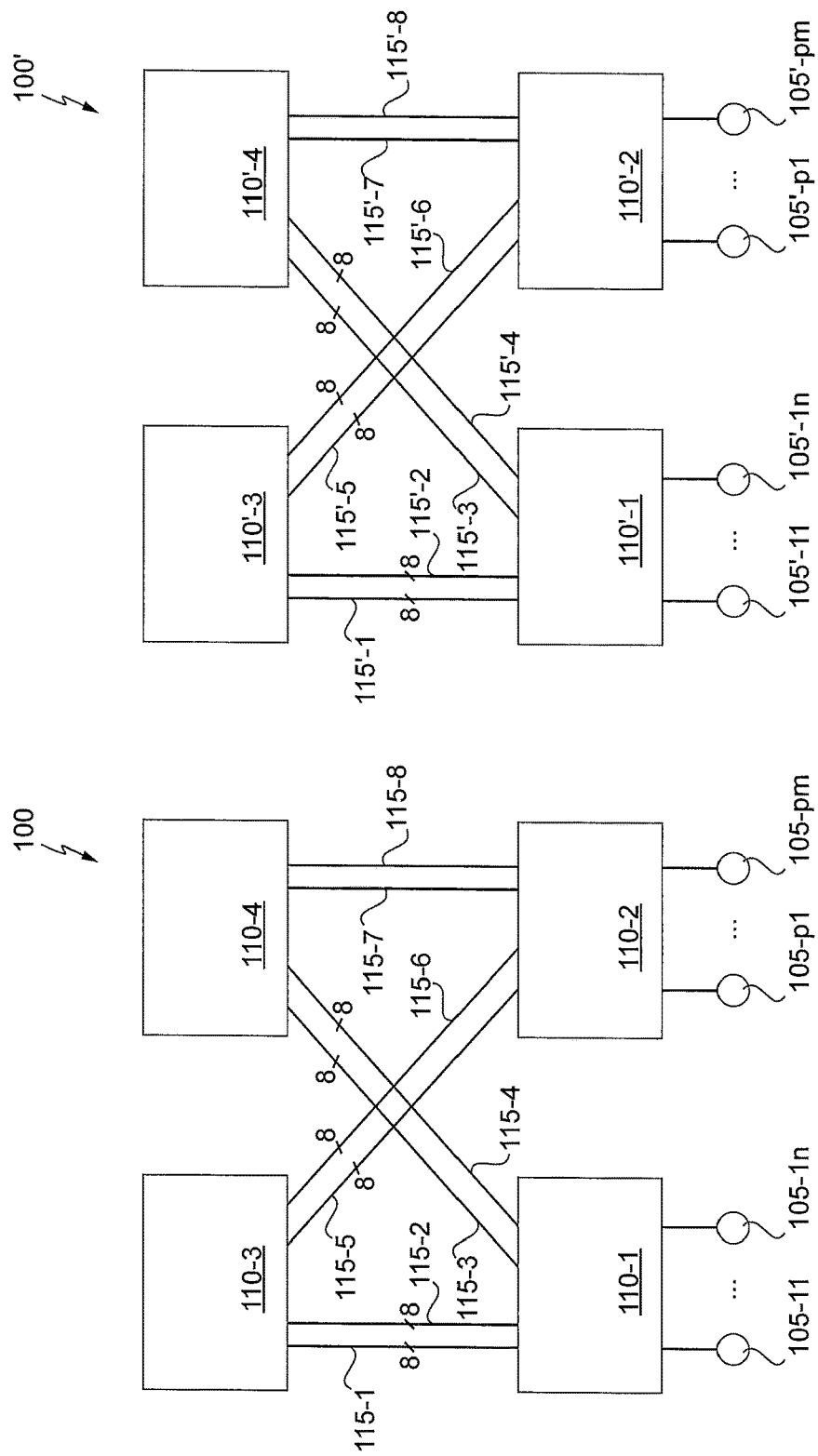
Figure 4:
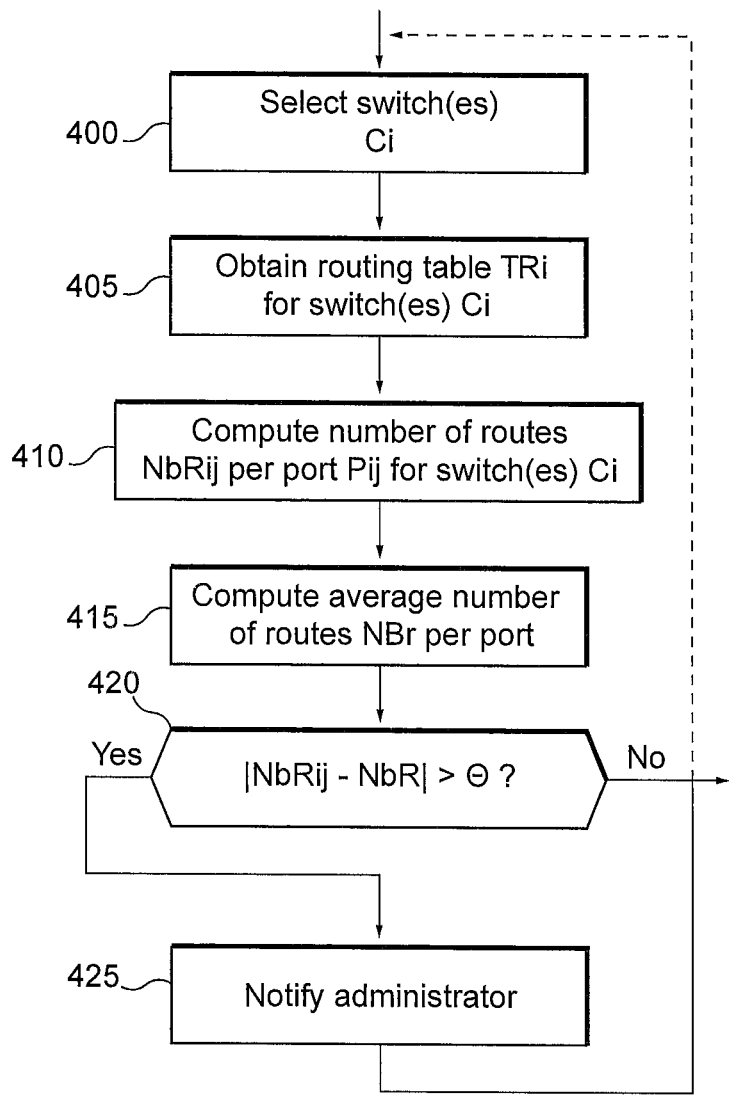
Figure 5:
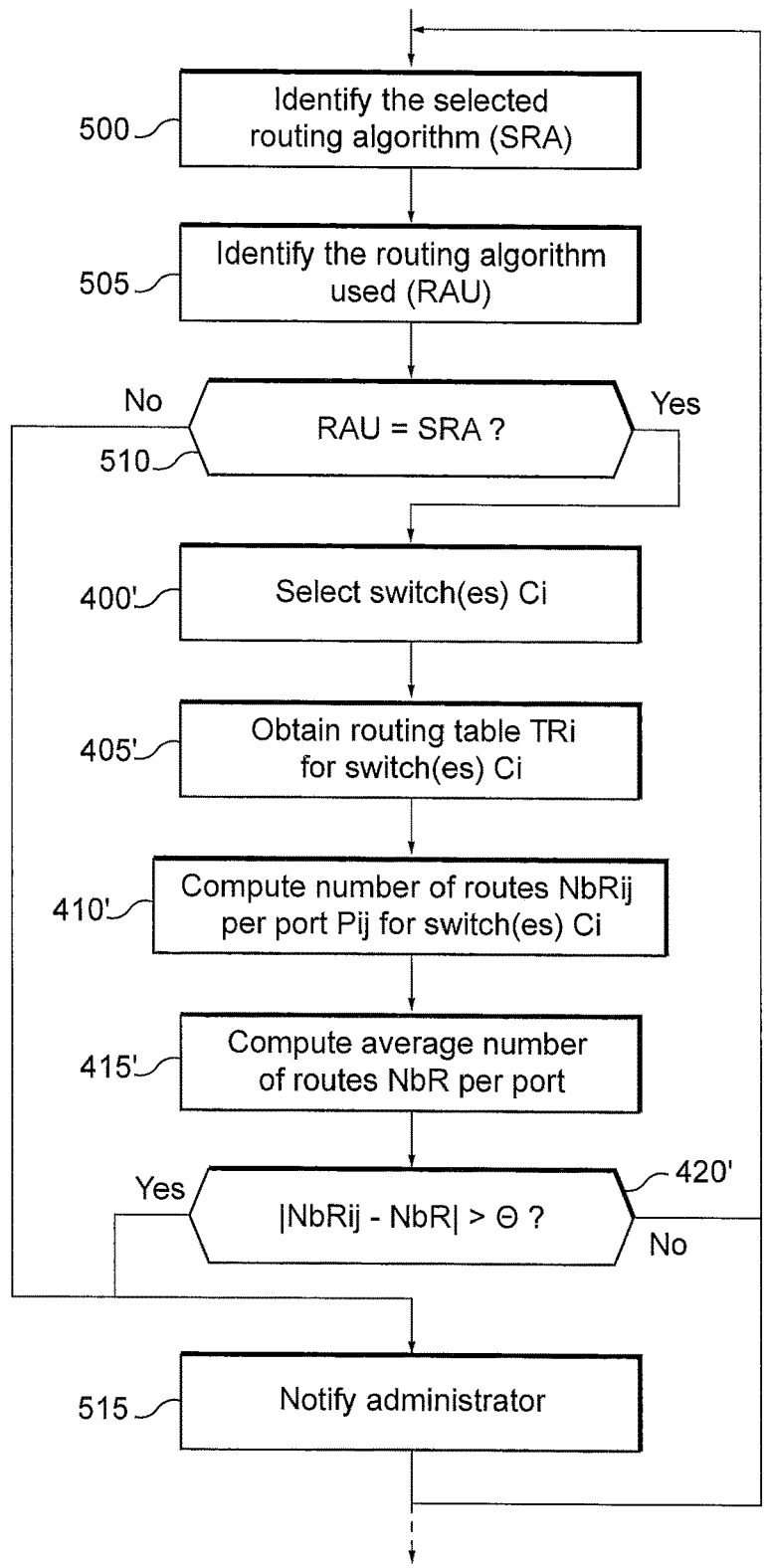

FIG. 3, comprising FIGS. 3a and 3b, illustrates an example of links between several switches when the routing is considered as balanced and when it is not, respectively;

FIG. 4 illustrates certain steps of an example algorithm for estimating a value representing the balancing of the routing of a cluster and, if required, for warning an administrator of a potential imbalance; and FIG. 5 illustrates certain steps of an example algorithm for warning an administrator if there is a risk of routing not enabling the operation of a cluster under its best conditions.

It has been observed that the routing quality of a cluster may be estimated according to the homogeneity of the distribution of the routes over the links between the different components of that cluster. In other words, a uniform distribution of the routes over the links leads to a uniform distribution of the loads relative to the data exchanges across the cluster, making it possible to avoid overuse of certain links and underuse of other links, which would typically lead to congestion and the increase in latency times.

The distribution of the routes over the links thus represents a routing quality index and more generally an index of quality of use of the components of the cluster.

Furthermore, it is to be recalled that the routing of data in a network of InfiniBand type, in the form of data packets, is based on a local relay mechanism according to an indication of destination called LID (acronym for Local IDentifier). Thus, each InfiniBand switch (comprising several input ports and several output ports) decides on what output port a packet must be sent according to the destination indication (LID) of the packet considered.

For such purposes, each switch uses a local routing table called LFT (standing for Linear Forwarding Table). Such tables, constructed during a routing step by a routing module and sent to each switch, establish a link between a destination indication (LID) of a data packet and an output port of the switch with which is associated the routing table considered. In other words, a step of local routing of an InfiniBand switch consists of a set of pairs each comprising a routing indication (LID) and an output port reference. An example of such a routing table is given in the appendix (Table 1).

When an InfiniBand switch receives a data packet, the header of the latter is analyzed to determine a destination indication (LID) thereof. The routing table is then consulted to determine the output port reference associated with such a destination indication. The packet is then sent to its destination via the output port of which the reference has been determined on the basis of the destination indication. Thus, for example, if a packet having, in its header, a destination indication equal to 28, arrives in an InfiniBand switch of which the routing table corresponds to table 1 given in the appendix, that packet is resent via the output port having the reference 25.

As indicated earlier, the routing of a cluster of InfiniBand type is static, which means that the routes are predictable and do not change until the cluster stops or until an item of equipment or a link experiences a fault leading to re-routing of the cluster. It is typically carried out by a routing module of the InfiniBand manager, called InfiniBand Subnet Manager, which is in charge of computing the routing tables of the switches and of sending them.

The InfiniBand manager generally offers several routing algorithms each having particular features. The choice of an algorithm is generally made by an administrator according to the topology of the cluster. Thus, for example, the administrator may choose the algorithm known under the name FTree which is particularly effective for clusters having a fat-tree type topology. If the InfiniBand manager fails in routing the cluster with the selected algorithm, an algorithm of less good performance is automatically selected, for example the algorithm known under the name MinHop.

When there are several communication links between two switches, the routing is considered as balanced, between those two switches, if there are the same number of routes per link. Conversely, the routing is not considered as balanced if there are not the same number of routes per link or if the number of routes per link varies beyond a threshold that is predetermined or dynamically computed.

FIG. 3, comprising FIGS. 3a and 3b, illustrates an example of links between several switches when the routing is considered as balanced and when it is not, respectively.

As illustrated in FIG. 3a the cluster 100 here comprises a first set of nodes referenced 105-11 to 105-1n, a second set of nodes referenced 105-p1 to 105-pm as well as four switches 110-1 to 110-4. Each node of the first set is linked to the switch 110-1 by a specific link. Similarly, each node of the second set is linked to the switch 110-2 by a specific link. The switch 110-1 is linked to the switch 110-3 by two links 115-1 and 115-2 and to the switch 110-4 by two links 115-3 and 115-4. Correspondingly, the switch 110-2 is linked to the switch 110-3 by two links 115-5 and 115-6 and to the switch 110-4 by two links 115-7 and 115-8.

As indicated in FIG. 3a, each of the links 115-1 to 115-8 comprises 8 routes. Therefore, as the number of routes per link is the same for all the links, the routing is considered as balanced.

FIG. 3b represents a cluster 100' similar to the cluster 100 illustrated in FIG. 3a. It comprises here two sets of nodes (105'-11 to 105'-1n and 105'-p1 to 105'-pm) as well as four switches (110'-1 to 110'-4). Each node of the first and second sets is linked to the switches 110'-1 and 110'-2, respectively, by a specific link. The switch 110'-1 is linked to the switches 110'-3 and 110'-4 by the two links 115'-1 and 115'-2 and the two links 115'-3 and 115'-4, respectively. Correspondingly, the switch 110'-2 is linked to the switches 110'-3 and 110'-4 by the two links 115'-5 and 115'-6 and the two links 115'-7 and 115'-8, respectively.

As indicated in FIG. 3b, the links 115'-1 and 115'-2 comprise 4 and 12 routes, respectively, whereas each of the links 115'-3 to 115'-8 comprise 8 routes. As the number of routes per link is not the same for all the links, the routing is not considered as balanced.

Thus, the routing quality of a cluster is determined here according to the distribution of the routes per switch port, for each switch, for all the switches of a group of switches (for example all the switches directly linked to one or more given components) or for all the switches of the cluster.

For these purposes, according to a particular embodiment, the routing table of each switch is analyzed to compute the number of routes per port, for each port of the switch considered. This analysis may be made by the InfiniBand manager.

By way of illustration, the routing table given in the appendix (table 1) may be used to compute the number of routes attributed to each output port of the corresponding switch. Table 2 provided in the appendix indicates the number of routes for each port. As indicated, five routes are attributed to port 21, three routes are attributed to port 19 and a single route to the other ports.

Thus, knowing the routing table of all the switches of the cluster, the InfiniBand manager or another monitoring module can compute the number of routes attributed to each output port of each switch and deduce therefrom an item of balancing information for the routing of the cluster.

FIG. 4 illustrates certain steps of an example algorithm for estimating a value representing the balancing of the routing of a cluster and, if required, for warning an administrator of a potential imbalance. This algorithm may, for example, be implemented in an InfiniBand manager.

As illustrated, a first step (step 400) is directed to the selection of switches Ci (i varying from 1 to the number NbC of switches selected). The selection may be of a single switch, all the switches of a group (for example all the switches directly linked to one or more given components) or all the switches of the cluster. The selection may be made automatically according to predetermined criteria, manually by an administrator or in a hybrid manner (a preselection for example being proposed to an administrator who can validate it and, if required, modify it).

In a following step, the routing table (TRi) associated with each selected switch is obtained (step 405). It is observed here that if the algorithm is implemented in an InfiniBand monitor, obtaining these tables is made particularly easy on account of the fact that the it is the InfiniBand manager that determines them. If the algorithm is implemented in another module, obtaining the routing tables may be carried out by requests made to the switches concerned, to the module or modules that created them or to any other device storing them in memory.

For each selected switch, the number of routes per output port NbRij (j varying from 1 to the number NbPi of output ports of the switch Ci) is computed on the basis of the routing table associated with that switch (step 410). As indicated earlier, the number of routes per link may be determined by counting the number of different destination indications (LID) associated with a same output port of a switch.

The average number of routes per port NbR is then computed for all the selected switches (step 415). This number is typically computed according to the following relation:

$$NbR = \frac{\sum_{i=1}^{NbC}\sum_{j=1}^{NbPi} NbRij}{\sum_{i=1}^{NbC} NbPi}$$

It is observed here that the granularity of the value representing the balancing of the routing of the cluster is determined by the set of the selected switches.

As indicated in FIG. 4 by the arrow in dashed line, the algorithm may be repeated for several sets of switches (and thus for each switch considered in isolation).

In a following step, the number of routes NbRij for each port j of each switch i is compared with the average number NbR of routes per port (step 420).

If the difference between the number of routes NbRij of the port j of the switch i and the average number NbR of routes per port exceeds a threshold θ, it is considered that the routing of the cluster is unbalanced. In this case, a notification is sent to an administrator (step 425), for example in the form of an electronic message. The notification may comprise an indication relative to the switch or switches concerned and, possibly, relative to the port or ports thereof, for which a potential problem has been detected.

The threshold θ beyond which it is considered that the routing of the cluster is unbalanced is, in theory, close to zero. However, in practice, it is preferably determined by the administrator according to the topology of the cluster and its load (linked, in particular, to the number and to the nature of the applications executed).

It is observed here that if it appears that a load problem is essentially linked to an overload of a link (when the number of routes NbRij of the port j of the switch i is greater than the average number NbR of routes per port), able to lead to congestion and/or an increase in latency times, an underload of a link (when the number of routes NbRij of the port j of the switch i is less than the average number NbR of routes per port) indicates that there is an overload elsewhere in the cluster, it being possible for that overload not to be detected (on account of a distribution of the overload over several links).

Naturally, it is possible only to detect the overloads (NbRij−NbR>θ), or even the underloads (NbR−NbRij>θ), or even the overloads and the underloads with different thresholds (NbRij−NbR>$θ_1$ or NbR−NbRij>$θ_2$).

According to another embodiment, the routing algorithm used is taken into account to warn an administrator of a potential routing problem.

FIG. 5 illustrates certain steps of an example algorithm for warning an administrator if there is a risk of routing not enabling the operation of a cluster under its best conditions.

In particular, the algorithm illustrated in FIG. 5 makes it possible to warn an administrator if the routing algorithm used is not the routing algorithm selected (or validated) by an administrator and/or if there is a potential routing imbalance in the cluster. This algorithm may in particular be implemented in an InfiniBand manager.

As illustrated, a first step here is directed to identifying the routing algorithm selected or validated by an administrator (SRA) to route the cluster (step 500). An identifier of that selected or validated algorithm may be obtained from the configuration parameters of the administration module of the cluster, for example an InfiniBand manager. Such an identifier may, for example, be the identifier "FTREE" designating the routing algorithm known under the name FTree.

Next, before or in parallel, the routing algorithm actually used (RAU) for routing the cluster is identified (step 505). Again, an identifier of that algorithm used may be obtained from the configuration parameters of the administration module of the cluster, for example an InfiniBand manager. Such an identifier may, for example, be the identifier "MIN-HOP" designating the routing algorithm known under the name MINHOP.

The identifier of the routing algorithm used is then compared with the selected routing algorithm (step 510). If these identifiers are different, a notification is sent to an administrator (step 515), for example in the form of an electronic message, indicating that the routing algorithm used is not the selected routing algorithm and furthermore mentioning, preferably, a reference of the routing algorithm used (and, optionally, a reference of the selected routing algorithm).

On the contrary, if the identifier of the routing algorithm used is the same as that of the selected routing algorithm (step 510), steps are carried out to estimate a value representing the balancing of the routing of a cluster and, if required, to warn an administrator of a potential imbalance. These steps, referenced 400' to 420', may be similar to steps 400 to 420 described with reference to FIG. 4.

As described above, step 400' is directed to the automatic, semi-automatic or manual selection of one or more switches Ci (i varying from 1 to number NbC of selected switches). The routing table (TRi) associated with each selected switch is obtained during a following step (step 405') it being once again observed here that if the algorithm is implemented in an InfiniBand manager, obtaining these tables is rendered particularly easy on account of the fact that it is the InfiniBand manager which determines them. If the algorithm is implemented in another module, obtaining the routing tables may be carried out by requests made to the switches concerned, made to the module or modules that created them or made to any other device storing them in memory.

For each selected switch, the number of routes per port NbRij (j varying from 1 to the number NbPi of ports of the switch Ci) is computed here on the basis of the routing table associated with that switch (step 410'). As indicated earlier, the number of routes per link may be determined by counting the number of different destination indications (LID) associated with a same port of a switch.

The average number of routes per port NbR is then computed for all the selected switches (step 415'). Again, this number is typically computed according to the following relation:

$$NbR = \frac{\sum_{i=1}^{NbC} \sum_{j=1}^{NbPi} NbRij}{\sum_{i=1}^{NbC} NbPi}$$

the granularity of the value representing the balancing of the routing of the cluster being determined by the set of the selected switches.

In a following step, the number of routes NbRij for each port j of each switch i is compared with the average number NbR of routes per port (step 420').

If the difference between the number of routes NbRij of the port j of the switch i and the average number NbR of routes per port exceeds a threshold θ, it is considered that the routing of the cluster is unbalanced. In this case, a notification is sent to an administrator (step 515), for example in the form of an electronic message. Again, the notification may comprise an indication relative to the switch or switches and, possibly, relative to the port or ports thereof, for which a potential problem has been detected.

Here too, it is possible only to detect the overloads (NbRij−NbR>θ), the underloads (NbR−NbRij>θ), or the overloads and the underloads with different thresholds (NbRij−NbR>$θ_1$ or NbR−NbRij>$θ_2$).

As illustrated in FIG. 5, the algorithm preferably loops on itself until it is made to terminate. It thus makes it possible to warn an administrator if there is a routing risk not enabling the operation of a cluster in its best conditions during the use thereof.

Figure 1:
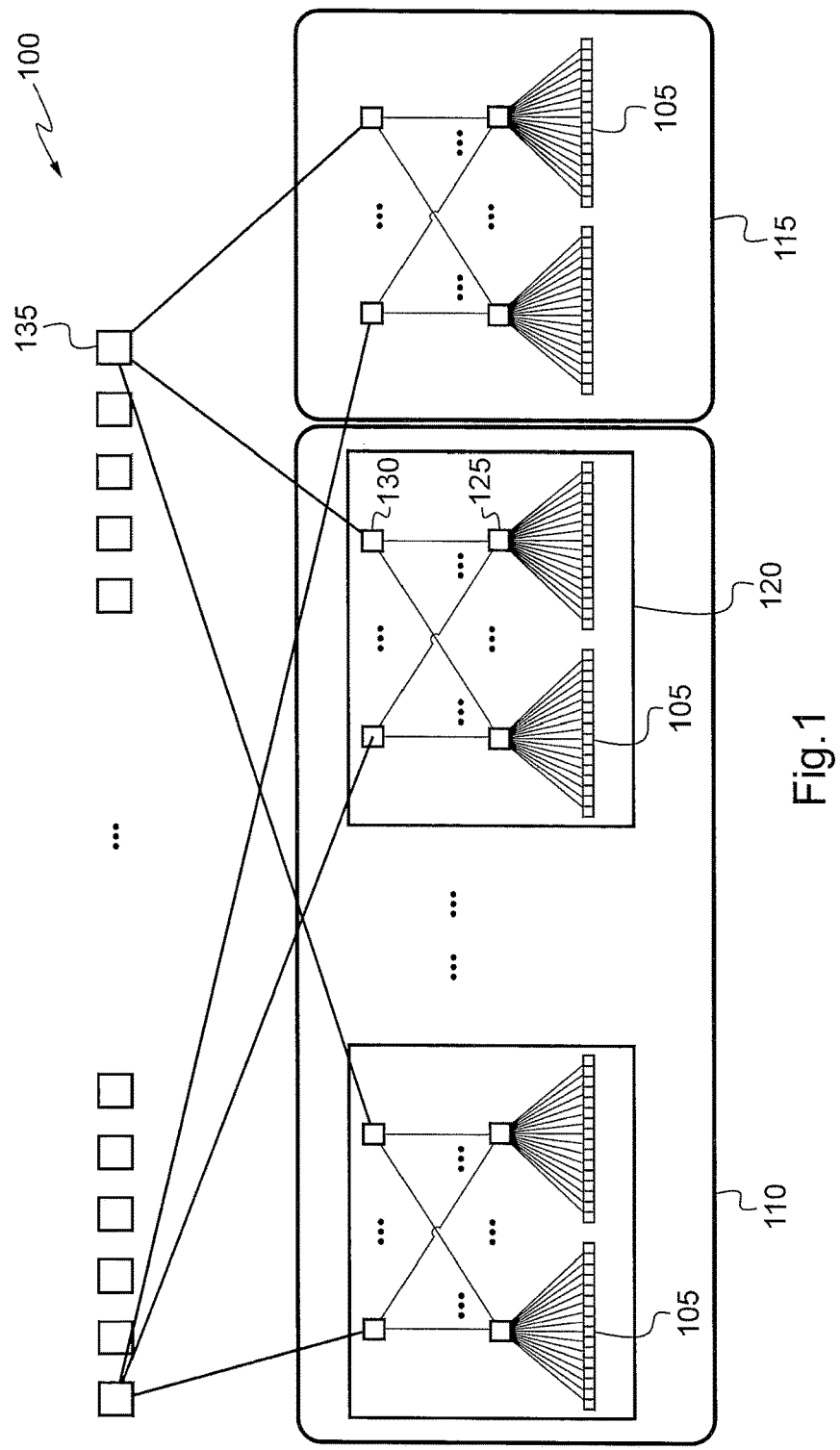
FIG. 1 illustrates an example of topology for a cluster.
Figure 2:
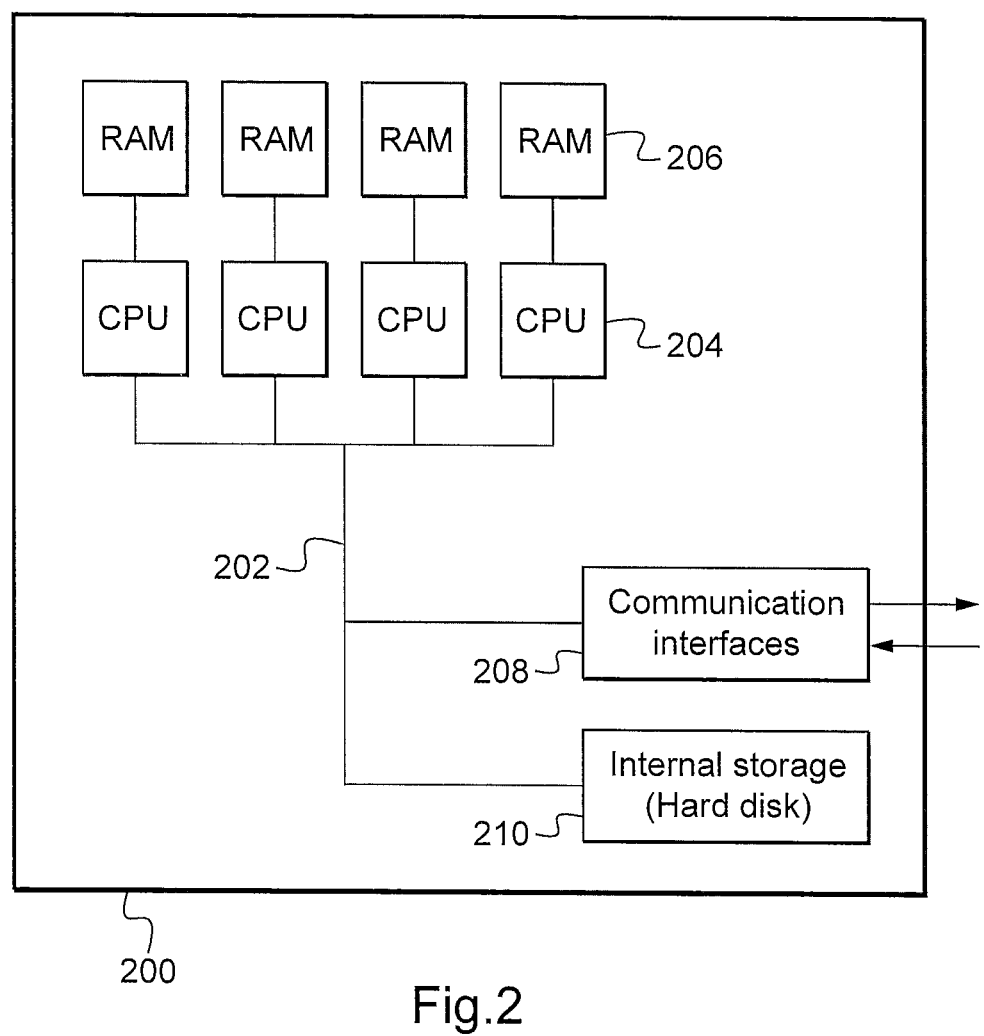
FIG. 2 illustrates an example of architecture for a node of a cluster.

It should be noted that the algorithms described with reference to FIGS. 4 and 5 may, for example, be implemented in a device similar to that described with reference to FIG. 2, in the form of a computer program.

Naturally, to satisfy specific needs, a person competent in the field of the invention will be able to apply modifications to the preceding description.

APPENDIX

TABLE 1

| LID | Port ref. |
|---|---|
| 2 | 19 |
| 4 | 21 |
| 5 | 19 |
| 7 | 21 |
| 8 | 21 |
| 10 | 22 |
| 11 | 23 |
| 12 | 10 |
| 15 | 19 |
| 17 | 21 |
| 18 | 7 |
| 20 | 21 |
| 25 | 9 |
| 28 | 25 |
| 31 | 32 |

TABLE 2

| Port ref. | No. of routes |
|---|---|
| 7 | 1 |
| 9 | 1 |
| 10 | 1 |
| 19 | 3 |
| 21 | 5 |
| 22 | 1 |
| 23 | 1 |
| 25 | 1 |
| 32 | 1 |

The invention claimed is:

1. A computer method for monitoring at least one routing parameter of a cluster comprising a plurality of nodes and a plurality of switches, static communication links linking nodes and switches of the pluralities of nodes and switches, each switch comprising a plurality of output ports and a routing table to identify a port according to a feature of a received data packet, the method comprising:
   selecting at least one switch from the plurality of switches;
   obtaining a routing table for each selected switch;
   computing a number of routes per port for each port of each selected switch based on the routing table obtained for each selected switch, routes being defined at a routing step such that each route links one node to another node;
   computing an average number of routes per port for the at least one selected switch;
   performing comparison of each computed number of routes per port with the computed average number of routes per port; and
   in response to the comparison, providing notification of a potential routing imbalance of the cluster.

2. The method according to claim 1, wherein the comparison of each number of routes per port with the average number of routes per port comprises computing a difference of each number of routes per port compared with the average number of routes per port and comparing the difference with at least one threshold.

3. The method according to claim 2, wherein the computing of the difference of each number of routes per port compared with the average number of routes per port is a step of computing an absolute value of the difference of each number of routes per port compared with the average number of routes per port.

4. The method according to claim 2, wherein the difference of each number of routes per port compared with the average number of routes per port is considered as being null if the difference is negative.

5. The method according to claim 2, wherein the comparison of the difference with at least one threshold comprises selecting a first or a second threshold depending on whether the difference is positive or negative.

6. The method according to claim 1 further comprising:
   identifying a selected routing algorithm to route the cluster;
   identifying an implemented routing algorithm used to route the cluster; and
   if the identifiers of the selected routing algorithm and the implemented routing algorithm are different, providing notification of a potential problem of routing optimization of the cluster.

7. The method according to claim 1 wherein the method loops back on itself to identify a potential routing problem of the cluster.

8. The method according to claim 1, the method being implemented in a cluster manager of InfiniB and type.

9. A non-transitory storage system including a computer program comprising instructions adapted for carrying out each step of the method according to claim 1 when the computer program is executed on a computer.

* * * * *